Sept. 17, 1940.                C. C. STRANGE ET AL                2,214,778
                                  LOCKING DEVICE
                                Filed July 30, 1937
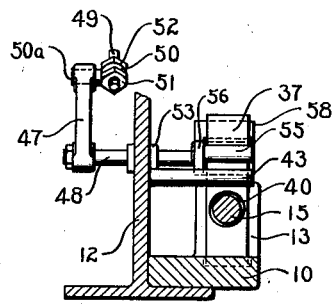
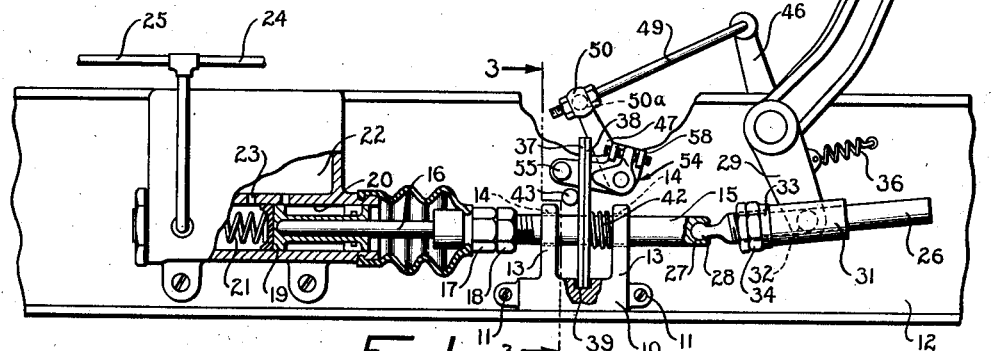
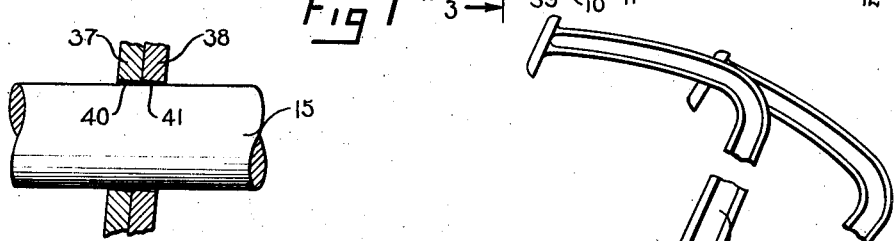
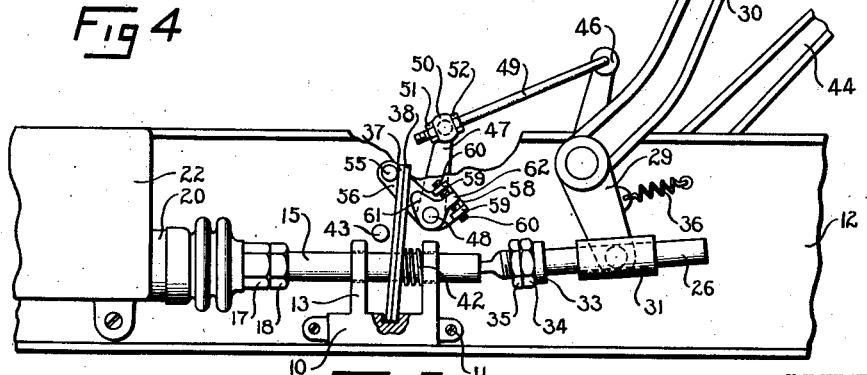
INVENTORS
Charles C. Strange
Eric J. Pilblad
BY F. Bascom Smith
ATTORNEY.

Patented Sept. 17, 1940

2,214,778

UNITED STATES PATENT OFFICE 2,214,778

LOCKING DEVICE

Charles C. Strange, Port Richmond, Staten Island, and Eric J. Pilblad, Rockville Centre, N. Y.

Application July 30, 1937, Serial No. 156,486

13 Claims. (Cl. 192—13)

This invention relates to locking devices and more particularly to aparatus whereby the locking and releasing of a movable member may be controlled by a second member which is movable relative to said first member.

One of the objects of the invention is to provide novel apparatus suited for controlling a motor vehicle brake mechanism by movement of the clutch, i. e., for holding the brake in applied position while the clutch is disengaged and releasing the same upon the engaging movement of the clutch so as to leave the motor vehicle operator's right foot free for application to the accelerator pedal.

Another object of the invention is to combine a device of the above character with hydraulically actuated brakes in a novel manner.

Another object is to provide a novel locking brake device adaptable for operation with the brake and clutch mechanisms of a motor vehicle which will in operation release the brake mechanism at any desired moment during the engaging movement of the clutch mechanism.

A further object of the present invention is the provision of novel locking means which may be rendered operable to lock the brake mechanism by the disengaging movement of the clutch mechanism.

Still another object of the invention is the provision of a locking device equipped with a novel, readily accessible, adjusting means for controlling the moment at which said locking device is released by coaction with the clutch mechanism.

A still further object of the invention is the provision of a novel locking device comprising locking members whereby a more positive and responsive locking and releasing action than is obtainable with prior art devices of a similar type is obtained.

Another object of the invention is to provide a novel locking mechanism that is simple in construction, easily installed, and adaptable to large scale production at low cost.

Still another object of this invention is to provide novel locking means for holding a brake mechanism, which means are compact, occupy only a small space and comprise only a small number of parts.

A still further object is the provision of novel apparatus of the above type which is adaptable for mounting and use in a motor vehicle without material alteration of the brake or clutch structure.

The above and further objects and novel features of the invention will more fully appear from the following detailed description when the same is taken in connection with the accompanying drawing. It is to be expressly understood, however, that the drawing is for the purpose of illustration only and is not intended to define the limits of the invention, reference being had for this latter purpose to the appended claims.

In the drawing, wherein like reference characters refer to like parts throughout the several views, Fig. 1 is a view in side elevation, partly in section and with parts broken away, of one embodiment of the present invention as applied to a motor vehicle brake and clutch structure;

Fig. 2 is a similar view showing the parts in locked position;

Fig. 3 is a detail sectional view with parts broken away, taken substantially along line 3—3 of Fig. 1; and Fig. 4 is an enlarged sectional view showing the action of the locking members.

In general, the single embodiment of the invention illustrated in the drawing, by way of example, comprises means for locking the hydraulically actuated brake mechanism of an automotive vehicle in applied position, said means being adapted to be rendered operative to hold the brakes in applied position only at the will of the driver and being so constructed as to not interfere in any way whatever with the normal or emergency application of the brakes. The locking means is preferably controlled by an element of the clutch mechanism in such a manner that an additional movement and slight effort in addition to that ordinarily employed in actuating the clutch is required to render said locking means operative. Said additional effort need not be a continuing effort, however, during the entire time that the brakes are being held in applied position but only a slight temporary effort to be applied during the last fraction of an inch of clutch pedal movement, for example, in clutch disengaging direction. The release of the locking means and, hence, release of the brakes, is accomplished by the engaging movement of the clutch mechanism, it being possible, if desired, to time the brake release in any suitable manner with respect to the actual engagement of the clutch driving surfaces. It is usually desirable to release the brakes at substantialy the same instant that the clutch plates or driving surfaces of the vehicle clutch mechanism engage and thereby prevent any backward rolling of the vehicle when starting up an incline.

In the single embodiment of the invention illustrated in the drawing, a frame or supporting member 10 is stationarily secured by any suitable means such as bolts or screws 11, 11 to the engine block or some part of the chassis represented diagrammatically on the drawing by the beam 12. Cast integrally with the frame 10 and extending upwardly therefrom are two lugs or arms 13, 13, through which openings 14, 14 are coaxially bored. The shape of openings 14, 14 is made to conform with the shape of a rod 15 which is preferably cylindrical and slidable therethrough. Rod 15 in the embodiment of the invention illustrated, is an element of a hydraulic brake system. It will be understood, however, that the locking device hereinafter described is adaptable for use with any motor vehicle brake mechanism of which a slidable member is a part or to which a slidable member may be suitably affixed so as to move with the elements which apply the braking pressure.

As shown, rod 15 is rigidly fixed at one end to a piston rod 16 by any suitable means such as nuts 17, 18 so as to be movable therewith and transmit pressure therethrough to piston 19. Piston 19 is reciprocable in a cylinder 20 for building up and transmitting the required fluid pressure in a conventional hydraulic braking system, said piston being maintained in its normal, released position (Fig. 1) by a compressed coil spring 21. Movement of the piston 19 to the left from its normal position causes a fluid in cylinder 20 to flow into the reservoir or overflow chamber 22 until opening 23 has been completely shut off by said piston and thereafter causes said fluid to flow through conduits 24 and 25 to the front and rear brakes, respectively, to apply said brakes (not shown) in a manner well known in the art.

For the purpose of moving rod 15, 16 and piston 19 to the left for applying the brakes, the other end of said rod 15 is pivotally connected by any suitable means to an arm 26, said means, in the embodiment shown, comprising a socket or recess 27 in the end of rod 15 and a ball or sphere 28 integral with arm 26 which fits into said recess and about which the walls of the recess may be peened to form a universal ball joint. Arm 26 is adapted to coact with the lower end 29 of a brake pedal 30 so as to transmit to rod 15 the braking pressure applied to said pedal by the driver and, hence, apply the brakes in the manner above described.

If, subsequently to the application of the braking pressure, the brakes are locked in applied position, such as by the novel locking means to be hereinafter fully described, the brake pedal will return to its normal position immediately upon removal of the operator's foot pressure and while the brake mechanism is otherwise in applied position. The means for accomplishing such action, as shown in the illustrated embodiment of the invention, comprises a sleeve 31 slidably mounted on arm 26 and pivotally connected by any suitable means, such as pin 32, to brake lever 29, 30. In normal unapplied position of the brakes and brake pedal, as shown in Fig. 1, sleeve 31 is adapted to bear against the face of a collar 33 which is integral with a nut 34. Nut 34 is threadedly secured to arm 26 and adapted to be locked in adjusted position by lock nut 35. Thus, as pedal 29, 30 is actuated in a clockwise direction, as viewed in the drawing, pressure is transmitted through sleeve 31 and collar 33 to rod 15, 16 and, hence, to piston 19 for applying the brakes. After application of the brakes, the brake pedal may be returned, upon release by the operator and independently of the brakes themselves, by any suitable means, such as a coil spring 36 which is shown fixed at one end to lever 29 and at the other end to the supporting member 12. It will be understood that the return of the brake pedal after removal of the operator's foot may be accomplished by providing means other than the pivotal sleeve connection shown, such other means being, for example, a pin fixed to the brake lever 29, 30 and adapted to be slidably mounted in a slot in arm 26.

A brake locking device, in order to be adaptable for large-scale commercial production, should be simple of construction and should consist of relatively few parts. The parts must be designed so as to be rapidly assembled and installed. Furthermore, the locking device should be positive in action and responsive to a simple control means. A novel locking means adapted to meet to the fullest extent these rigid requirements of the automotive industry has been provided by the present invention and, as shown, said means comprise a plurality of relatively thin locking members or plates, two such plates 37, 38 being shown, by way of example, although any other reasonable number may be utilized depending upon the degree of gripping action and responsiveness of such action which is desired. Said locking plates are freely mounted for pivotal movement in a groove 39 in supporting frame 10 so that the same may be angularly displaced to a limited extent relative to said frame and yet be held against bodily movement with rod 15 as the latter is moved axially. Groove 39 is positioned between arms 13, 13 so that plates 37, 38 extend upwardly between said arms and rod 15 passes through registering openings 40 and 41 in plates 37 and 38, respectively. Said openings have diameters slightly greater than the diameter of rod 15 so that when axes of the openings are coincident with the axis of the rod, the latter will be free to move relative to locking plates 37, 38. If, however, said plates are angularly displaced with respect to rod 15 so that the walls of openings 40, 41 come into gripping engagement with the periphery of the rod, as shown in Fig. 4, said rod will be locked against axial movement in the direction of the relative angular displacement. It will be readily understood that, with plates 37, 38 in locking position, the greater the force acting upon the locked member, i. e., rod 15, in the direction against which the same is held against movement, the greater will be the locking or gripping action of the plates since the said force will, by reason of the gripping action, tend to increase the angular displacement of the plates. Any increase in angular displacement of the locking plates relative to rod 15 will necessarily cause an increase in the degree of contact between the locked member and the locking plates, and thus in the gripping action of the plates.

Less angular displacement is required of a thin locking member in apparatus of this character to obtain a given gripping action than is required of a relatively thick locking plate and if the plate is too thick it is impossible to obtain a satisfactory gripping action. Accordingly, the use of a plurality of locking plates results in a greater total gripping surface per unit of total thickness of the locking members with a smaller angular displacement thereof than is obtainable when a single, comparatively thick locking member is employed. A more positive and more responsive locking device is thus provided without sacrificing strength. Furthermore, the distance from the pivotal axis of the plates to the axis of the plate opening need not be as great for a thin plate as for a thicker plate, thereby reducing the amount of material which is required and increasing the rigidity.

A light coil spring 42 is preferably interposed between member 38 and one of arms 13 and, as shown, surrounds rod 15. Said spring exerts only a sufficient expansive force to maintain plates 37, 38 in an upright, inoperative position in contact with a pin 43, said pin being rigidly fixed to the supporting member 12 and properly positioned relative to slot 39 so that plate 37 will contact the same only when the faces of the locking plates are substantially perpendicular to the axis of the rod 15, that is, in such position as to permit said rod to move freely therethrough. Spring 42 does not exert a great enough pressure to interfere with the movement of the locking plates 37, 38 into operative position nor to independently effect the release of said plates when the brakes are being held in locked position thereby.

To effect the movement of locking plates 37, 38 into and out of locking engagement with rod 15 of the brake mechanism, novel control means which may be readily attached to the clutch mechanism for operation thereby are provided, said novel means, in the form shown, comprising a lever 46 fulcrumed about the same axis as clutch pedal 44 and rigidly connected to said pedal so as to be angularly movable therewith. A second arm or lever 47 is keyed or otherwise fixed to rotate with a short shaft 48 which is journalled for rotary movement in a bearing 53 formed in beam 12 (Fig. 3). A link 49 which is pivotally fixed at one end to lever 46 and at the other end to arm 47 serves to connect said lever and arm and to transmit the angular motion of the clutch pedal to arm 47, and thus impart a proportionate angular movement to shaft 48. The pivotal connection between arm 47 and link 49 may be of any suitable type, such as a sleeve 50 slidably mounted on link 49 and pivotally connected to arm 47 by a laterally projecting pin 50a. Sleeve 50 is adjustably fixed against movement along link 49 by nuts 51 and 52 which are threadedly secured to said link.

Mounted on the brake pedal side of support 12 on shaft 48 for rotation therewith is a bell crank lever 54 on one arm 56 of which a laterally extending pin 55 is suitably fixed, said pin being of sufficient length to engage locking plate 37 and move the same to tilted or locking position when shaft 48 is rotated in a clockwise direction. Cast integrally with the other arm 58 of bell crank lever 54 are two laterally extending lugs 59, 59 that are coaxially bored to threadedly receive studs or set screws 60, 60.

A cam 61 is mounted on shaft 48 so as to be free to rotate thereon. Studs 60, 60, by engaging a lug 62 which is integral with said cam and extends radially from shaft 48 prevent relative rotation of said cam and shaft, except for the purpose of adjustment, and cause said cam to rotate in both directions with bell crank lever 54 and, hence, with clutch pedal 44. Shaft 48 and the bell crank lever attachment 54 are suitably positioned with respect to locking plates 37, 38 and support 10 so that said locking plates extend between pin 55 and the outer end of cam 61, whereby the plates may be pivotally moved by either the cam or pin depending on the direction of rotation of shaft 38. The same control of the pivotal movement of said locking plates may be obtained by the use of a lever having two pins integral therewith, i. e., a bifurcated element with laterally extending arms which correspond to pin 55 and cam 61 of lever 54 and are suitably disposed with relation to plates 37, 38.

When the locking plates 37, 38 are in their normal disengaged position, as shown in Fig. 1, and the center line of openings 40, 41 is coincident with the axis of rod 15, the latter is free to move axially in either direction. Plates 37, 38 when in said position extend between pin 55 and cam 61 but are not in contact with either the pin or the cam. By depressing the brake pedal 30 the brake mechanism is applied and the brakes remain in applied position as long as the brake pedal is depressed, that is, as long as the motor vehicle operator maintains the pressure on said brake pedal. In normal operation, when this pressure is relieved, pedal 30 is returned to its normal position by the pressure exerted upon it by coil spring 36 and by coil spring 21 through collar 33. If, however, the plates 37, 38 are angularly displaced so as to have the walls of openings 40, 41 engage rod 15 as shown in Fig. 4, then said rod will be restrained from any movement in the direction of this displacement. Thus, the force of spring 21 tending to return the brake mechanism to unapplied position will be counterbalanced by the gripping action of plates 37, 38 upon rod 15 and, if the operator's foot pressure is then relieved, the brakes will remain in applied position. Brake pedal 30, however, will return to normal position with the release of the operator's foot under the pressure applied to it by coil spring 36 (Fig. 2).

The angular displacement of the plates 37, 38 to lock rod 15 is effected by movement of the clutch mechanism to disengaged position, said movement being transmitted through lever 46, link 49, arm 47 and shaft 48 to bell crank lever 54 so as to move said lever in a clockwise direction. Said clockwise rotation of crank 54 will at some predetermined position of the clutch mechanism, cause pin 55 to engage plate 37 and thereafter to pivotally move plates 37, 38 against the force of spring 42 into locking engagement with rod 15. By adjustment of nuts 51 and 52 so as to vary the effective length of link 49, the engagement of pin 55 with the locking plate 37 can be made to occur at any desired position of the clutch mechanism in its disengaging movement. It is preferable to have pin 55 begin to displace plates 37, 38 at a point in the movement of the clutch pedal that is appreciably past the point at which the clutch plates are fully disengaged. This arrangement will give the operator of a motor vehicle the option of using the holding device or not, as he sees fit, without preventing or affecting in any way the normal use of the clutch and brake mechanism. To apply the locking device, a slight additional pressure to the clutch pedal must be exerted to overcome the pressure of spring 42 and initiate a gripping action. This pressure is, however, too small in magnitude to require any material additional exertion by the operator, the same being only sufficient to give him notice of the application of the holding device.

Once plates 37, 38 have been displaced so as to be in locked or gripping engagement with rod 15, pressure need no longer be applied to plates 37, 38 by pin 55 since the force which is resisted by the plates, namely, the pressure of spring 21 and the usual brake releasing springs transmitted to rod 15, tends to increase the effectiveness of the locking engagement, as has been heretofore pointed out. As a result, the operator may relax and permit the partial return of the clutch pedal without releasing the brakes, taking precaution, however, to limit this return so that cam 61 will not contact plate 38. Even though members 37, 38 are in locked position and held therein by the pressure of pin 55, the brakes may nevertheless be further applied at any time by exerting the necessary pressure on pedal 30.

Cam 61 is suitably constructed and adjusted so that, upon the return of the clutch mechanism to engaged position and the consequent counter-clockwise rotation of lever 54, it will engage the angularly displaced plate 38 and force plates 37 and 38 out of their locked engagement with rod 15. The position of the clutch mechanism at which the release of the locking plates and, hence, of the brakes, occurs is preferably at substantially the point of clutch plate engagement. Release of the brakes at the instant of clutch plate engagement in this manner insures against any backward rolling or stalling of the vehicle when the latter is being started up an incline. To obtain release of the brakes at the desired time, cam 61 is equipped with independent adjusting means comprising lug 62 and coacting studs 60, 60. The cam position may be adjusted roughly prior to installation and then by trial a finer adjustment may be made after installation, the simple type of adjusting means being extremely adaptable for such procedure and for changes in the adjustment when wear in the clutch plates makes such changes advisable.

There is thus provided novel apparatus which is particularly adapted for holding the brakes of an automotive vehicle in applied position, said apparatus being so constructed that it will not interfere in any way with the normal operation of the brake and clutch mechanism, the same being rendered operative only at the conscious will of the operator. Novel means are provided for controlling the engagement of the holding elements which means are directly connected to the clutch mechanism and readily adjustable for variation of the point at which the clutch will render the device provided is very efficient and extremely responsive to movement by the control means for locking and unlocking the member to be held. Adjusting means are also provided whereby the point of engagement and disengagement of the locking means may be readily varied. Furthermore, the device of the present invention comprises only a small number of simple, readily assembled parts which may be quickly and properly installed in a vehicle by any ordinary mechanic.

Although only a single embodiment of the invention has been illustrated and described in detail, it is to be expressly understood that the same is not limited thereto but that various changes may be made, particularly in the design and arrangement of parts illustrated without departing from the spirit and scope of the invention, as will now be apparent to those skilled in the art. For a definition of the limits of the invention, reference will be had primarily to the appended claims.

What is claimed is:

1. In apparatus of the class described, a longitudinally movable element, guide means for said element, means for holding said element against movement in one direction comprising a plurality of comparatively thin locking members pivotally mounted adjacent said element with adjacent faces thereof in sliding engagement, said members having aligned openings therein through which said element slidably extends, whereby said members are adapted to grip said element when the same are tilted relative to the axis of said element, and means normally holding said members in non-tilted position.

2. In apparatus of the class described, a longitudinally movable element, pivotally mounted means having portions spaced radially with respect to the axis of rotation of said means, and pivoted locking means extending between said portions and having an opening through which said element slidably extends, whereby said locking means is adapted to grip said element when said locking means are tilted relative to the axis of said element, said locking means being adapted to be engaged by one of said portions to be moved into locking position and by the other of said portions to be moved out of locking position.

3. In apparatus of the class described, a longitudinally movable element, pivotal locking means adapted to frictionally hold said element against movement in at least one direction, and a member pivotable about an axis, said member having a pair of axially extending arms mounted thereon, said arms being disposed on opposite sides of the free end of said locking means and being adapted to engage and move said locking means into and out of locking engagement with said movable element.

4. In apparatus of the class described, a longitudinally movable element, locking means associated therewith and adapted to lock said element when pivotally displaced relative to the longitudinal axis of said element, and means for controlling the angular displacement of said locking means comprising a pivotally mounted member having laterally extending elements disposed one on each side of said locking means and adapted to displace said locking means in the direction in which said member is pivoted.

5. In combination with the brake and clutch mechanisms of a motor vehicle, an element movable with said brake mechanism, holding means adapted to hold said element against movement in at least one direction to lock said brake mechanism in applied position, and pivotal means movable by said clutch mechanism for rendering said holding means operative at one point of clutch movement and inoperative at a different point of clutch movement to hold said element.

6. In combination with the brake and clutch mechanisms of a motor vehicle, an element movable with said brake mechanism, holding means adapted to hold said element against movement in at least one direction to lock said brake mechanism in applied position, and pivotal means controlled by movement of said clutch mechanism for moving said holding means into and out of operative position at different points respectively in the movement of the clutch mechanism.

7. In combination with the brake and clutch mechanisms of a motor vehicle, an element movable with said brake mechanism, holding means adapted to hold said element against movement in at least one direction to lock said brake mechanism in applied position, and pivotal means controlled by movement of the clutch mechanism adapted to move said holding means into operative position on the disengaging stroke of said clutch mechanism at one point in the travel of the latter and into inoperative position on the engaging stroke thereof at a different point in the travel of said mechanism.

8. The combination with the brake and clutch mechanisms of a motor vehicle of a supporting member, an element movable with the brake mechanism, locking means comprising a plurality of locking plates mounted on said member with adjacent faces thereof in sliding engagement and adapted to hold said element against movement in at least one direction, and means actuated by the clutch mechanism for controlling the engagement of said locking means with said element, said last-named means comprising a pin for moving said locking means into engagement with said element and an adjustable cam member for moving said locking means out of engagement with said element.

9. The combination with the brake and clutch mechanisms of a motor vehicle of a supporting member, frictional locking means mounted on said member, resilient means normally holding said locking means in inoperative position, an element movable with the brake mechanism and adapted to be engaged by said locking means to hold said brake mechanism in applied position, and clutch actuated means for controlling the engagement of said locking means, said clutch actuated means comprising a lever having a pin for moving said locking means into engagement against the action of said resilient means mounted thereon and a cam for moving said locking means out of engagement associated therewith.

10. The combination with the brake and clutch mechanisms of a motor vehicle of a supporting member, locking means comprising a plurality of locking plates mounted on said member with the adjacent faces thereof in sliding engagement, an element movable with the brake mechanism and adapted to be engaged by said locking means to hold said brake mechanism in applied position, and clutch actuated means for controlling the engagement of said locking means, said clutch actuated means comprising a lever having a member for moving said locking means into engagement mounted thereon and a second member for moving said locking means out of engagement associated therewith.

11. The combination with the brake and clutch mechanism of a motor vehicle of a support, an element associated with the brake mechanism, means for connecting said element to the pedal of said brake mechanism so as to transmit the motion of said pedal to said element only in one direction, means mounted on said support for engaging said element so as to lock it against motion in the other direction, and means mounted on said support for moving said locking means into and out of engagement with said element.

12. In combination with the brake and clutch mechanisms of a motor vehicle, an element movable with said brake mechanism, means for connecting the brake pedal to said brake mechanism to transmit motion of said pedal to said mechanism in only one direction, resilient means coacting with said pedal and yieldingly opposing the motion of said pedal in said direction, means comprising a multiplicity of locking plates for holding said element against motion in a direction opposite to said direction, other resilient means in contact wtih said locking plates tending to hold said holding means inoperative, and pivotal means movable with said clutch mechanism adapted to move said locking means into and out of locking engagement with said element.

13. In combination with the brake and clutch mechanisms of a motor vehicle, means including an element movable with the brake mechanism for connecting the brake pedal to said brake mechanism to transmit motion of said pedal to said mechanism in only one direction, resilient means yieldingly opposing the motion of said pedal in brake applying direction, locking means for holding said element against motion in brake releasing direction, yielding means normally holding said locking means in inoperative position, and pivotal means movable with said clutch mechanism adapted to move said locking means into and out of locking engagement with said element.

CHARLES C. STRANGE.
ERIC J. PILBLAD.